(12) United States Patent
Guy et al.

(10) Patent No.: US 9,120,164 B2
(45) Date of Patent: Sep. 1, 2015

(54) CUTTING TOOL HAVING A TOOL COUPLING WITH OFFSET PERIPHERAL AND CENTRAL COUPLING THREADS AND METHOD OF ASSEMBLY THEREOF

(71) Applicant: Iscar, Ltd., Tefen (IL)

(72) Inventors: Hanoch Guy, Petach Tikva (IL); Alexander Zibenberg, Nahariya (IL)

(73) Assignee: Iscar, Ltd., Tefen (IL)

( * ) Notice: Subject to any disclaimer, the term of this patent is extended or adjusted under 35 U.S.C. 154(b) by 349 days.

(21) Appl. No.: 13/872,569

(22) Filed: Apr. 29, 2013

(65) Prior Publication Data

US 2014/0321928 A1   Oct. 30, 2014

(51) Int. Cl.
*B23C 5/10* (2006.01)
*B23B 29/04* (2006.01)
*B23B 31/11* (2006.01)

(52) U.S. Cl.
CPC .......... *B23C 5/10* (2013.01); *B23B 29/046* (2013.01); *B23B 31/11* (2013.01); *B23B 2260/056* (2013.01); *B23B 2260/138* (2013.01); *Y10T 29/49826* (2015.01); *Y10T 407/193* (2015.01)

(58) Field of Classification Search
CPC ...... B23B 29/02; B23B 29/046; B23B 29/20; B23B 2240/04; B23B 31/11; B23B 2210/02; B23B 2231/0204; B23B 2251/02; B23C 5/10
See application file for complete search history.

(56) References Cited

U.S. PATENT DOCUMENTS

| | | |
|---|---|---|
| 2,113,821 A | 4/1938 | Baash |
| 4,292,866 A * | 10/1981 | Kaczynski ............ 82/158 |
| 4,557,642 A | 12/1985 | Dudás et al. |
| 4,655,631 A * | 4/1987 | Mitchell ............ 403/349 |
| 4,784,543 A * | 11/1988 | Mitchell et al. ............ 409/234 |
| 4,930,956 A | 6/1990 | Mantovani |
| 5,988,953 A | 11/1999 | Berglund et al. |
| 6,506,003 B1 | 1/2003 | Erickson |
| 6,582,164 B1 | 6/2003 | McCormick |
| 6,619,165 B2 * | 9/2003 | Perkowski ............ 82/160 |
| 7,713,004 B2 | 5/2010 | Lehto et al. |

(Continued)

FOREIGN PATENT DOCUMENTS

| | | |
|---|---|---|
| GB | 765943 | 1/1957 |
| KR | 2013 0079935 | 7/2013 |
| WO | WO 2011/006804 | 1/2011 |

OTHER PUBLICATIONS

International Search Report dated Jul. 23, 2014 issued in PCT counterpart application (No. PCT/IL2014/050328).

*Primary Examiner* — Will Fridie, Jr.
(74) *Attorney, Agent, or Firm* — Womble Carlyle (57) ABSTRACT

A cutting tool includes first and second components, configured for differential coupling with each other. The first and second components each include peripheral and central coupling threads which each extend in a helical direction about a component axis of the respective component. Each component's peripheral and central coupling threads are axially offset with respect to each other. The first and second components each include a radial stop surface located at the respective peripheral coupling thread. In an assembled position of the cutting tool, the radial stop surfaces abut each other and the peripheral and central coupling threads of the first component threadingly engage the peripheral and central coupling threads of the second component, respectively, forming a differential tool coupling between the first and second components.

30 Claims, 4 Drawing Sheets

(56) References Cited

U.S. PATENT DOCUMENTS 8,668,413 B2 * 3/2014 Volokh .......................... 409/234
2009/0010709 A1 1/2009 Bergloew et al.
2012/0009027 A1 * 1/2012 Sharivker et al. ............... 407/42
2013/0142582 A1 * 6/2013 Lee .............................. 408/226

* cited by examiner

CUTTING TOOL HAVING A TOOL COUPLING WITH OFFSET PERIPHERAL AND CENTRAL COUPLING THREADS AND METHOD OF ASSEMBLY THEREOF

FIELD OF THE INVENTION

The subject matter of the present application relates to cutting tools of the type in which the cutting tool has a tool coupling for coupling a first component and a corresponding second component. In particular, the tool coupling is a threaded coupling.

BACKGROUND OF THE INVENTION

Cutting tools can be provided with a tool coupling for securely coupling a first component to a second component.

In some such cutting tools, the tool coupling is a threaded coupling. Examples of such cutting tools are disclosed in, for example, U.S. Pat. No. 6,582,164, U.S. Pat. No. 7,713,004 and US 2012/0009027.

In other such cutting tools the tool coupling provides a differential action to securely fasten the first and second components together. Examples of such cutting tools are disclosed in, for example, GB 765943, U.S. Pat. No. 4,930,956 and U.S. Pat. No. 4,557,642.

In still other such cutting tools, the tool coupling can include a stop surface extending in a general radial direction. Examples of such cutting tools are disclosed in U.S. Pat. No. 6,506,003 and U.S. Pat. No. 5,988,953.

SUMMARY OF THE INVENTION

In accordance with a first aspect of the subject matter of the present application, there is provided a cutting tool, having a cutting portion, comprising a first component and a second component.

The first component has a first component axis and comprises: first peripheral and central coupling threads, each extending in a helical direction about the first component axis, the first peripheral and central coupling threads being axially offset with respect to each other; and a first radial stop surface located at the first peripheral coupling thread.

The second component has a second component axis and comprises: second peripheral and central coupling threads, each extending in a helical direction about the second component axis, the second peripheral and central coupling threads being axially offset with respect to each other; and a second radial stop surface located at the second peripheral coupling thread.

The cutting tool is adjustable between an unassembled position and an assembled position. In the unassembled position, the first and second components are separated from one another. In the assembled position: the first and second radial stop surfaces abut each other; the first peripheral and central coupling threads threadingly engage the second peripheral and central coupling threads, respectively, and a differential tool coupling is formed between the first and second components.

In accordance with a further aspect of the subject matter of the present application, there is also provided a cutting tool, having a cutting portion, comprising a first component and a second component.

The first component has a first component axis and comprises: first peripheral and central coupling threads, each extending in a helical direction about the first component axis, the first peripheral and central coupling threads being axially offset with respect to each other; and a first radial stop surface located at the first peripheral coupling thread.

The second component has a second component axis and comprises: second peripheral and central coupling threads, each extending in a helical direction about the second component axis, the second peripheral and central coupling threads being axially offset with respect to each other; and a second radial stop surface located at the second peripheral coupling thread.

The first and second peripheral coupling threads have a peripheral coupling thread pitch; the first and second central coupling threads have a central coupling thread pitch; and the peripheral coupling thread pitch is less than the central coupling thread pitch.

The cutting tool is adjustable between an unassembled position and an assembled position. In the unassembled position, the first and second components are separated from one another. In the assembled position: the first and second radial stop surfaces abut each other; the first peripheral and central coupling threads threadingly engage the second peripheral and central coupling threads, respectively.

In accordance with another aspect of the subject matter of the present application, there is also provided a cutting tool, having a cutting portion, comprising a first component and a second component.

The first component has a first component axis and comprises: first peripheral and central coupling threads, each extending in a helical direction about the first component axis, the first peripheral and central coupling threads being axially offset with respect to each other, the first central coupling thread being a non-continuous thread formed on a female member; and a first radial stop surface located at the first peripheral coupling thread.

The second component has a second component axis and comprises: second peripheral and central coupling threads, each extending in a helical direction about the second component axis, the second peripheral and central coupling threads being axially offset with respect to each other, the second central coupling thread being a non-continuous thread formed on a male member; and a second radial stop surface located at the second peripheral coupling thread.

The first and second components are configured to permit insertion of the male member into the female member, followed by a rotation of the first and second components relative to one another by no more than a total of 90° to have the first and second radial stop surfaces abut each other, during which rotation the first and second central coupling threads engage one another and, simultaneously, the first and second peripheral coupling threads engage one another.

In accordance with a yet further aspect of the subject matter of the present application, there is also provided a method for assembling a cutting tool of the sort described above. The method includes:

positioning the first component relative to the second component so that they are substantially axially aligned, with the peripheral coupling thread of one component adjacent the central coupling thread of the other component;

displacing the first and second components axially towards each other until the first and second peripheral coupling threads come into contact with each other and the first and second central coupling threads come into contact with each other;

rotating the first and second components relative to one another until the first peripheral and central coupling threads threadingly engage the second peripheral and central coupling threads, respectively, to thereby initiate differential tool coupling between the first and second components; and further rotating the first and second components relative to one another until the first and second radial stop surfaces abut each other.

It is understood that the above-said is a summary, and that features described hereinafter may be applicable in any combination to the subject matter of the present application, for example, any of the following features may be applicable to the cutting tool or the method of assembling the cutting tool.

The first and second peripheral coupling threads can each have approximately one turn.

The first and second peripheral coupling threads can each have slightly less than one turn.

The first radial stop surface can be located on a first connecting surface that extends between two first thread end edges of the first peripheral coupling thread. The second radial stop surface can be located on a second connecting surface that extends between two second thread end edges of the second peripheral coupling thread.

The first radial stop surface can lie on a first stop plane containing the first component axis. The second radial stop surface can lie on a second stop plane containing the second component axis.

The first and second central coupling threads can each comprise at least three turns.

The first component can further comprise a first coupling end surface and a first peripheral surface forming a circumferential boundary thereof. The first peripheral coupling thread can extend along at least a majority of the periphery of the first coupling end surface. The second component can further comprise a second coupling end surface and a second peripheral surface forming a circumferential boundary thereof. The second peripheral coupling thread can extend along at least a majority of the periphery of the second coupling end surface.

The first and second peripheral coupling threads can be ground.

The first and second peripheral coupling threads can have a peripheral coupling thread pitch. The first and second central coupling threads can have a central coupling thread pitch. The peripheral coupling thread pitch can be less than the central coupling thread pitch.

One of the first and second components can form a tool body. The other one of the first and second components can form a tool head on which the cutting portion is located.

The first coupling end surface can comprise a female member recessed therein. The first central coupling thread can be located on the female member, forming an internal thread. The second coupling end surface can comprise a male member protruding therefrom. The second central coupling thread can be located on the male member, forming an external thread.

The first and second central coupling threads can be non-continuous threads. The portion of the female member on which the first central coupling thread is located can comprise two diametrically opposed female non-threaded side surfaces. The portion of the male member on which the second central coupling thread is located can comprise two diametrically opposed male non-threaded side surfaces.

The female member can comprise a hollowed substantially cylindrical female locating portion axially interposed between the first peripheral and central coupling threads. The male member can comprise a substantially cylindrical male locating portion axially interposed between the second peripheral and central coupling threads.

In the assembled position, at least the male locating portion of the male member can be elastically deformed.

In the assembled position the first and second components can be axially aligned.

In the assembled position, at least the majority of the periphery of each the first and second coupling end surfaces abut each other.

The cutting tool can be a right-handed cutting tool. One of the first and second radial stop surfaces is located on the tool body and can be configured to oppose the torque generated when the cutting portion engages a work piece.

A pin can have a cap portion. In the assembled position the pin can be releasably attached to the cutting tool so that the cap portion can be located in a recessed portion of the first and second peripheral surfaces.

The cutting tool can be a left-handed cutting tool. The cap portion can be configured to oppose the torque generated when the cutting portion engages a work piece.

The cutting tool can be devoid of any additional threaded attachment member for differentially coupling the first and second components together.

The cutting portion can be integrally formed to have unitary one-piece construction with the tool head.

The cutting portion can comprise a cutting insert releasably retained therein, the cutting portion being made of a first material and the cutting insert being made of a second harder material.

The cutting tool can be a turning cutting tool.

The method of assembling the cutting tool can comprise the step of:

angularly aligning the female and male non-threaded side surfaces before displacing the first and second components axially towards each other; and rotating the first and second components relative to one another by no more than a total of 90° to have the first and second radial stop surfaces abut each other.

The method of assembling the cutting tool can also comprise the step of:

slidingly receiving the male locating portion into the female locating portion.

BRIEF DESCRIPTION OF THE FIGURES

For a better understanding of the present application and to show how the same may be carried out in practice, reference will now be made to the accompanying drawings, in which.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 1:
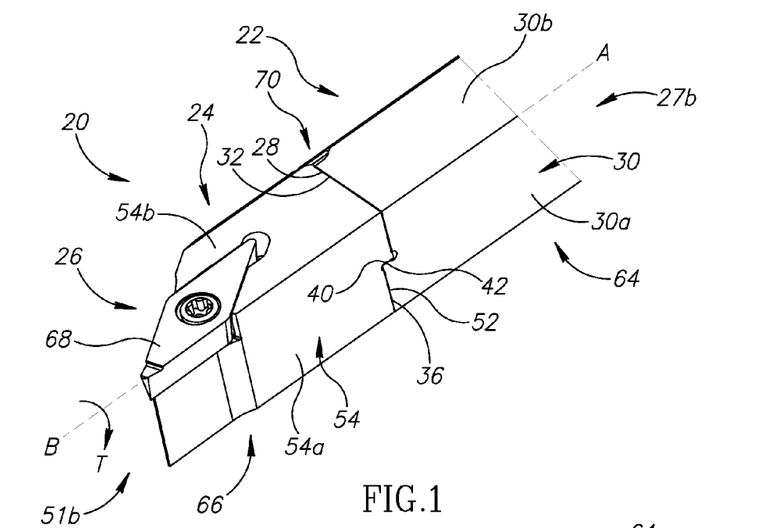
FIG. 1 is a perspective view of a cutting tool.
Figure 2:
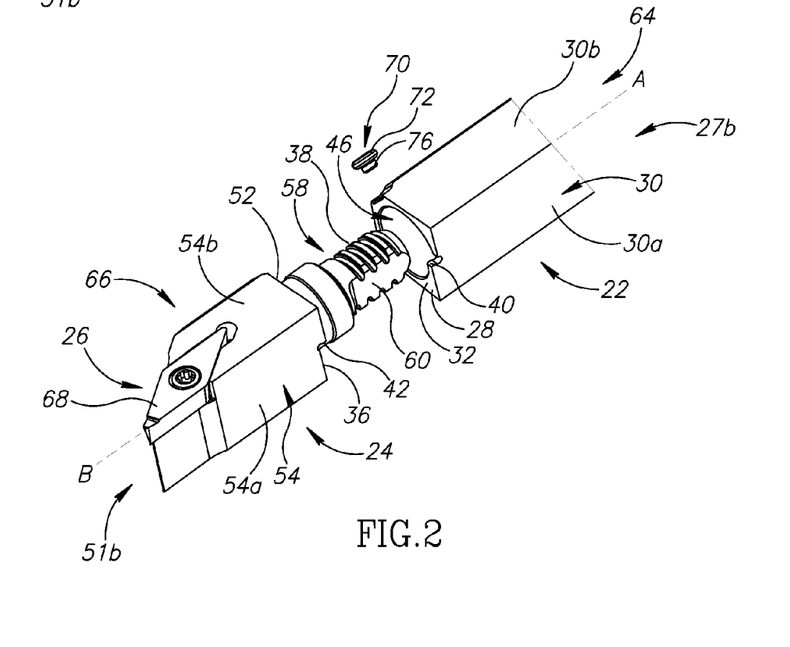
FIG. 2 is an exploded perspective view of the cutting tool shown in FIG. 1.

Attention is first drawn to FIGS. 1 and 2 showing a cutting tool 20 of the type used for turning metal cutting operations, in accordance with embodiments of the subject matter of the present application. The cutting tool 20 includes a first component 22 that has a first component axis A. The first component 22 can be typically made from steel. The cutting tool 20 also includes a second component 24. The second component 24 is complementary to the first component 22. The second component 24 has a second component axis B. The second component 24 can be typically made from steel. The cutting tool 20 has a cutting portion 26 located on one of the first and second components 22, 24. The first and second components 22, 24 are coupled together by means of a differential tool coupling. Such a differential tool coupling could possibly be advantageous for other types of cutting operations than those stated hereinabove, such as, for example, milling and drilling.

Figures 3, 4, 5:
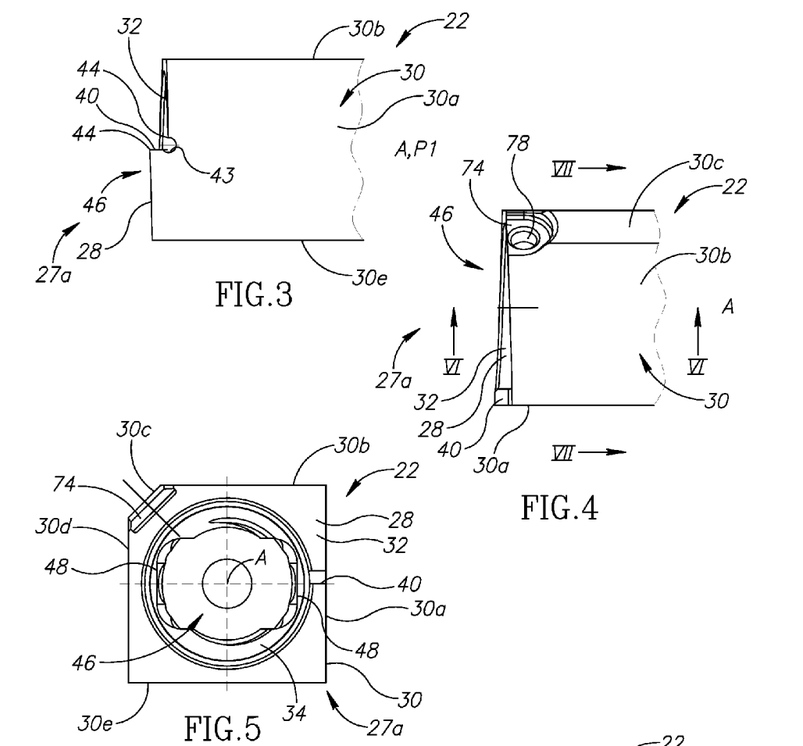
FIG. 3 is a side view of a first component shown in FIGS. 1 and 2.
FIG. 4 is a plan view of the first component shown in FIG. 3.
FIG. 5 is a first coupling end surface end view of the first component shown in FIG. 3 taken along a first component axis.

Reference is now made to FIGS. 3 to 7, showing the first component 22. The first component 22 includes first coupling and non-coupling ends 27a, 27b. The first component 22 includes a first coupling end surface 28 and a first peripheral surface 30, where the first peripheral surface 30 forms a circumferential boundary of the first coupling end surface 28. The first coupling end surface 28 is formed at the first coupling end 27a. As seen in FIG. 5, the first peripheral surface 30 can include a plurality, for example five, first peripheral sub-surfaces 30a, 30b, 30c, 30d, 30e. However it will be understood that the first peripheral surface 30 could instead be cylindrical, in which case there would only be one continuous surface.

Figure 6:
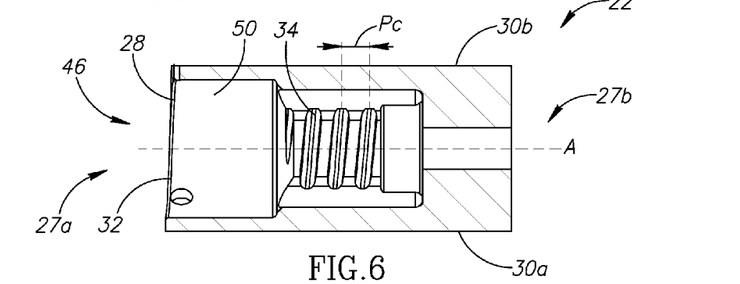
FIG. 6 is a cross section view taken along line VI-VI shown in FIG. 4.
Figure 7:
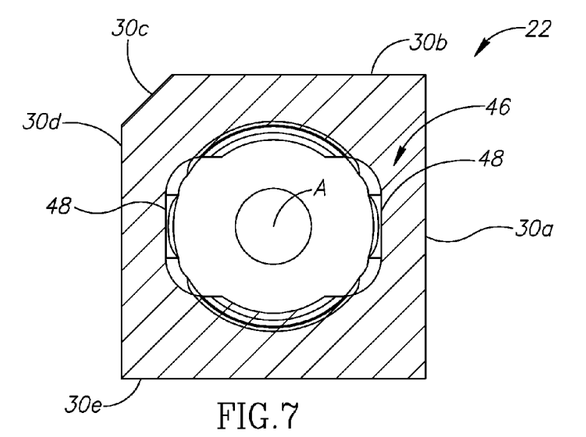
FIG. 7 is a cross section view taken along line VII-VII shown in FIG. 4.

As shown particularly in FIG. 6, the first component 22 includes first peripheral and central coupling threads 32, 34. The first peripheral and central coupling threads 32, 34 are intended to threadingly engage corresponding second peripheral and central coupling threads 36, 38 on the second component 24. Each first peripheral and central coupling thread 32, 34 extends in a helical direction about the first component axis A. The first peripheral and central coupling threads 32, 34 can be continuous or non-continuous threads. It will be understood that reference to a "continuous thread" throughout the description and claims refers to a thread where the edge of the crest of the thread lies completely on the contour of its associated helix and a "non-continuous thread" refers to a thread where the edge of the crest of the thread does not lie completely on the contour of its associated helix. As seen in FIG. 6, the first peripheral and central coupling threads 32, 34 are axially offset with respect to each other.

In accordance with some embodiments of the subject matter of the present application, the first peripheral coupling thread 32 can have approximately one turn. For example, the first peripheral coupling thread 32 can have between 0.9 and 1.1 turns. Optimally, the first peripheral coupling thread 32 can have slightly less than one turn. For example, the first peripheral coupling thread 32 can have between 0.95 and 0.99 turns. It will be understood that reference to "one turn" throughout the description and claims refers to one 360° rotation about the thread axis. The first peripheral coupling thread 32 can have a peripheral coupling thread pitch $P_P$. The first peripheral coupling thread 32 can extend along at least a majority of the periphery of the first coupling end surface 28. The first peripheral coupling thread 32 can be ground.

A first radial stop surface 40 is located at the first peripheral coupling thread 32. The first radial stop surface 40 can extend in a general radial direction and face in the circumferential direction. One purpose of the first radial stop surface 40 is to abut a corresponding second radial stop surface 42 of the second component 24, thus ensuring advantageous precise repeatable positioning of the cutting portion 26 in the same circumferential location when the cutting tool 20 is in the assembled position.

In accordance with some embodiments of the subject matter of the present application, the first radial stop surface 40 can be located on a first connecting surface 43 that extends between two first thread end edges 44 of the first peripheral coupling thread 32. The first radial stop surface 40 can lie on a first stop plane P1 that contains the first component axis A. That is to say, as seen in a side view of the first component 22 (i.e. FIG. 3) the first radial stop surface 40 is generally perpendicular to the first coupling end surface 28. It will be understood that "thread end edges" are the edges located at the extreme ends of the thread, as measured along the helical path of the thread.

In accordance with some embodiments of the subject matter of the present application, the first central coupling thread 34 can comprise at least three turns. The first central coupling thread 34 can have a central coupling thread pitch $P_C$.

In accordance with some embodiments of the subject matter of the present application, the first component 22 can include a female member 46 recessed in the first coupling end surface 28. The first central coupling thread 34 can be located on the female member 46. By virtue of the first central coupling thread 34 being formed on the female member 46, the first central coupling thread 34 is an internal thread. The first central coupling thread 34 can be a non-continuous thread. The portion of the female member 46 on which the first central coupling thread 34 is located can include two diametrically opposed female non-threaded side surfaces 48. The female member 46 can include a hollowed substantially cylindrical female locating portion 50 axially interposed between the first peripheral and central coupling threads 32, 34.

Figure 8:
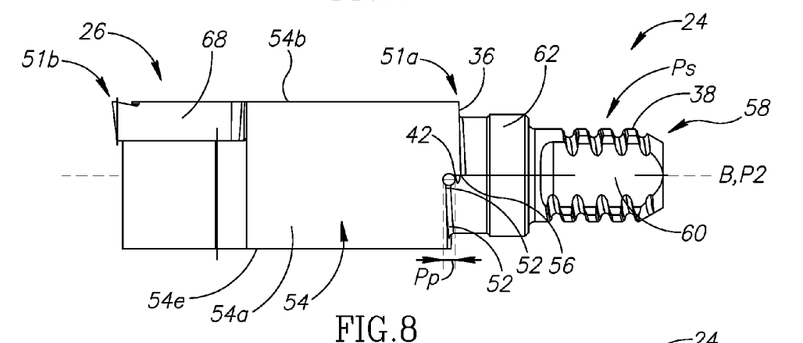
FIG. 8 is a side view of a second component shown in FIGS. 1 and 2.
Figure 9:
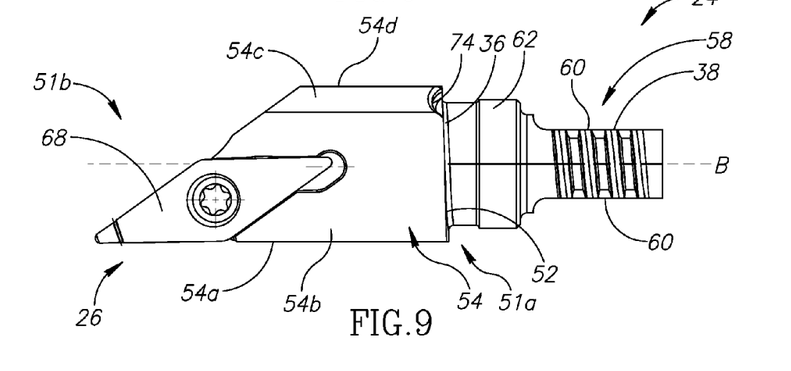
FIG. 9 is a plan view of the second component shown in FIG. 8.
Figure 10:
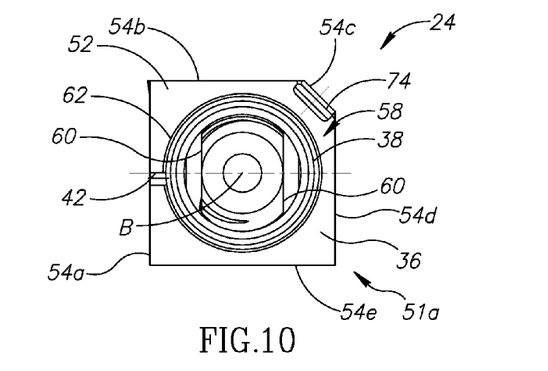
FIG. 10 is a second coupling end surface end view of the second component shown in FIG. 8 taken along a second component axis.

Reference is now made to FIGS. 8 to 10, showing the second component 24. The second component 24 includes second coupling and non-coupling ends 51a, 51b. The second component 24 includes a second coupling end surface 52 and a second peripheral surface 54, where the second peripheral surface 54 forms a circumferential boundary of the second coupling end surface 52. The second coupling end surface 52 is formed at the second coupling end 51a. As seen in FIG. 10, the second peripheral surface 54 can include a plurality, for example five, second peripheral sub-surfaces 54a, 54b, 54c, 54d, 54e. However it will be understood that the second peripheral surface 54 could instead be cylindrical, in which case there would only be one continuous surface.

As shown in FIGS. 8 and 10, the second component 24 includes second peripheral and central coupling threads 36, 38. Each second peripheral and central coupling thread 36, 38 extends in a helical direction about the second component axis B. The second peripheral and central coupling threads 36, 38 can be continuous or non-continuous threads. As seen in FIG. 8, the second peripheral and central coupling threads 36, 38 are axially offset with respect to each other.

In accordance with some embodiments of the subject matter of the present application the second peripheral coupling thread 36 can have approximately one turn. For example, the second peripheral coupling thread 32 can have between 0.9 and 1.1 turns. Optimally, the second peripheral coupling thread 36 can have slightly less than one turn. For example, the second peripheral coupling thread 32 can have between 0.95 and 0.99 turns. The second peripheral coupling thread 36 can have a peripheral coupling thread pitch $P_P$. The second peripheral coupling thread 36 can extend along at least a majority of the periphery of the second coupling end surface 52. The second peripheral coupling thread 36 can be ground.

The second radial stop surface 42 is located at the second peripheral coupling thread 36. The second radial stop surface 42 can extend in a general radial direction and face in the circumferential direction.

In accordance with some embodiments of the subject matter of the present application the second radial stop surface 42 can be located on a second connecting surface 55 that extends between two second thread end edges 56 of the second peripheral coupling thread 36. The second radial stop surface 42 can lie on a second stop plane P2 that contains the second component axis B. That is to say, as seen in a side view of the second component 24 (i.e. FIG. 8) the second radial stop surface 42 is generally perpendicular to the second coupling end surface 52.

In accordance with some embodiments of the subject matter of the present application, the second central coupling thread 38 can comprise at least three turns. The second central coupling thread 38 can have a central coupling thread pitch $P_C$. The peripheral coupling thread pitch $P_P$ is less than the central coupling thread pitch $P_C$.

In accordance with some embodiments of the subject matter of the present application, the second component 24 can include a male member 58 that protrudes from the second coupling end surface 52. The second central coupling thread 38 can be located on the male member 58. By virtue of the second central coupling thread 38 being formed on the male member 58, the second central coupling thread 38 is an external thread. The second central coupling thread 38 can be a non-continuous thread. The portion of the male member 58 on which the second central coupling thread 38 is located can include two diametrically opposed male non-threaded side surfaces 60. The male member 58 can include a substantially cylindrical male locating portion 62 axially interposed between the second peripheral and central coupling threads 36, 38.

As shown in FIGS. 1, 2, 11 and 12, one of the first and second components 22, 24 forms a tool body 64. The other one of the first and second components 22, 24 forms a tool head 66 that includes the cutting portion 26 located at the respective first or second non-coupling end 27b, 51b. In accordance with some embodiments of the subject matter of the present application, the cutting portion 26 can be integrally formed to have unitary one-piece construction with the tool head 66. In accordance with some other embodiments of the subject matter of the present application, the cutting portion 26 can include a cutting insert 68 releasably retained thereon. The cutting portion 26 can be made of a first material and the cutting insert 68 can be made of a second harder material. The cutting portion 26 includes a cutting edge. When the cutting portion 26 includes a cutting insert 68, the cutting edge is on the cutting insert 68.

Referring again to FIGS. 1, 2, 11 and 12, the cutting tool 20 is adjustable between an unassembled position and an assembled position. When the cutting tool 20 is in the assembled position the first and second radial stop surfaces 40, 42 abut each other. The first peripheral and central coupling threads 32, 34 threadingly engage the second peripheral and central coupling threads 36, 38, respectively. By virtue of the fact that the peripheral coupling thread pitch $P_P$ is less than the central coupling thread pitch $P_C$, a differential tool coupling between the first and second components 22, 24 is formed. Configuring the tool coupling to be differential advantageously ensures that the first and second radial stop surfaces 40, 42 only abut each other when the first and second components 22, 24 are securely coupled together. Likewise, the differential coupling ensures that contact between first and second coupling end surfaces 28, 52 before the first and second radial stop surfaces 40, 42 abut each other, does not prevent further rotation that allows the said first and second radial stop surfaces 40, 42 to abut each other.

Figure 12:
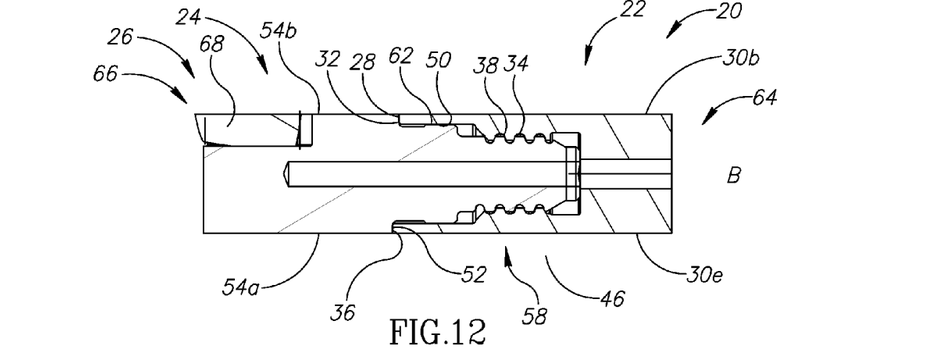
FIG. 12 is a cross section view taken along line XII-XII shown in FIG. 11.

The first and second coupling end surfaces 28, 52 can abut each other. Configuring the first and second peripheral coupling threads 32, 36 to be ground advantageously facilitates the surface contact between the first and second peripheral coupling threads 32, 36.

In accordance with some embodiments of the subject matter of the present application, in the assembled position, at least the male locating portion 62 of the male member 58 can be elastically deformed. By virtue of the elastic deformation, the first and second components 22, 24 are coupled in a tight engagement. The first and second components 22, 24 can be axially aligned.

It is understood, that by virtue of the tool coupling, when in an assembled position of the cutting tool 20, the cutting tool 20 is devoid of any additional threaded attachment member for differentially coupling the first and second components 22, 24 together. For example, the coupling arrangement disclosed in U.S. Pat. No. 4,557,642 includes an additional threaded attachment member in the form of a differential screw to couple two components together, while the cutting tool having the tool coupling in accordance with the present disclosure requires no such screw.

Figure 11:
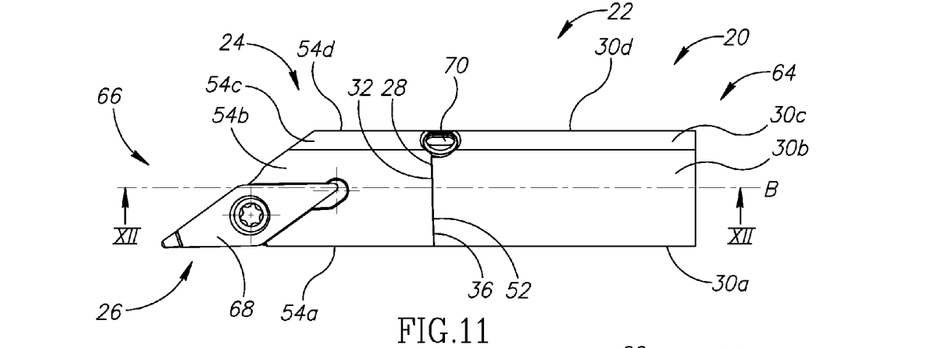
FIG. 11 is a plan view of the cutting tool shown in FIG. 1.

In accordance with some embodiments of the subject matter of the present application, the cutting tool 20 can be a right-handed cutting tool. In accordance with some other embodiments of the subject matter of the present application the cutting tool 20 can be a left-handed cutting tool. When the cutting tool 20 is configured as a right-handed cutting tool for turning metal cutting operations, one of the first and second radial stop surfaces 40, 42 is located on the tool body 64 and can be advantageously configured to oppose the torque T generated when the cutting portion 26 engages a work piece. When the cutting tool 20 is a left-handed cutting tool for turning metal cutting operations, the cutting tool 20 can include a pin 70 that has a cap portion 72. In the assembled position of the cutting tool 20, the pin 70 can be releasably attached to the cutting tool 20 so that the cap portion 72 is located in a recessed portion 74 of the first and second peripheral surfaces 30, 54. The pin 70 can include a threaded portion 76 and the pin 70 can be threadingly attached in a threaded bore 78 located in the first peripheral surface of 30 of the cutting tool 20. The cap portion 72 can be advantageously configured to oppose the torque T generated when the cutting portion 26 engages a work piece.

Another aspect of the subject matter of the present application includes a method of assembling the cutting tool 20. Reference is first made to FIG. 2, showing the first and second components 22, 24. The first component 22 is positioned relative to the second component 24 so that they are substantially axially aligned, with the peripheral coupling thread 32, 36 of one component 22, 24 adjacent the central coupling thread 34, 38 of the other component 22, 24. The first and second components 22, 24 are axially displaced towards each other until the first and second peripheral coupling threads 32, 36 come into contact with each other and the first and second central coupling threads 34, 38 come into contact with each other. At least one of the first and second components 22, 24 is rotated relative to the other in one direction until the first peripheral and central coupling threads 32, 34 threadingly engage the second peripheral and central coupling threads 36, 38, respectively, thus initiating a differential tool coupling between the first and second components 22, 24. At least one of the first and second components 22, 24 is further rotated relative to the other in the same direction until the first and second radial stop surfaces 40, 42 abut each other.

In accordance with some embodiments of the subject matter of the present application the female and male non-threaded side surfaces 48, 60 can be angularly aligned before the step of displacing the first and second components 22, 24 axially towards each other. By virtue of performing the angular alignment of the female and male non-threaded side surfaces 48, 60 the male member 58 can be fully inserted into the female member 46. Therefore the steps of rotating at least one of the first and second components 22, 24 relative to the other can include no more than a 90° relative rotation, in total.

Thus, the first and second components 22, 24 are configured to permit insertion of the male member 58 into the female member 46, followed by a rotation of the first and second components 22, 24 relative to one another by no more than a total of 90° to have the first and second radial stop surfaces 40, 42 abut each other, during which rotation the first and second central coupling threads 34, 38 engage one another and, simultaneously, the first and second peripheral coupling threads 32, 36 engage one another.

In accordance with some embodiments of the subject matter of the present application the step of displacing the first and second components 22, 24 axially towards each other can include the step of slidingly receiving the male locating portion 62 into the female locating portion 50. This is accomplished by virtue of the angularly alignment of the female and male non-threaded side surfaces 48, 60.

It should be noted that a feature of the subject matter of the present application is that, by virtue of the first and second radial stop surfaces 40, 42, the cutting portion 26 can be accurately repeatedly positioned in the same circumferential location, relative to the tool body 64, when the tool head 66 is indexed. This is particularly important for turning metal cutting tools when it is important that the cutting portion 26 is located in a precise circumferential position.

It should be further noted that a feature of the subject matter of the present application is that the cutting tool 20 has a quick-change coupling.

It should be yet further noted that a feature of the subject matter of the present application is that by virtue of the pin 70, the tool coupling is suitable for right and left handed tools, without the need to provide the cutting tool 20 with a reverse 'handed' direction of the first and second peripheral and central coupling threads 36, 38, nor the need to reconfigure the first and second radial stop surfaces 40, 42.

It should be yet still further noted that configuring the first and second peripheral coupling threads 32, 36 to extend along at least the majority of the periphery of each of the first and second coupling end surfaces 28, 52, respectively, provides a robust support region between the first and second components 22, 24.

A number of advantages may be realized with a tool having a tool coupling in accordance with the present disclosure. In addition, the tool coupling is possible with no additional fastening member, such as a locknut or a screw. Furthermore, the tool coupling may ensure accurate repeatable rotational positioning of a cutting portion when the cutting portion is indexed and the cutting tool is in an assembled position. Lastly, the tool coupling includes a radial stop surface that acts to oppose the torque generated when the cutting tool engages a work piece.

Although the subject matter of the present application has been described to a certain degree of particularity, it should be understood that various alterations and modifications could be made without departing from the spirit or scope of the invention as hereinafter claimed.

What is claimed is:

1. A cutting tool (20), having a cutting portion (26), comprising:
   a first component (22) having a first component axis (A) and comprising:
      first peripheral and central coupling threads (32, 34), each extending in a helical direction about the first component axis (A), the first peripheral and central coupling threads (32, 34) being axially offset with respect to each other; and
      a first radial stop surface (40) located at the first peripheral coupling thread (32); and
   a second component (24) having a second component axis (B) and comprising:
      second peripheral and central coupling threads (36, 38), each extending in a helical direction about the second component axis (B), the second peripheral and central coupling threads (36, 38) being axially offset with respect to each other; and
      a second radial stop surface (42) located at the second peripheral coupling thread (36);
   wherein the cutting tool (20) is adjustable between:
      an unassembled position in which:
         the first and second components are separated from one another, and
      an assembled position in which:
         the first and second radial stop surfaces (40, 42) abut each other;
         the first peripheral and central coupling threads (32, 34) threadingly engage the second peripheral and central coupling threads (36, 38), respectively, and
         a differential tool coupling is formed between the first and second components (22, 24).

2. The cutting tool (20) according to claim 1, wherein the first and second peripheral coupling threads (32, 36) each have approximately one turn.

3. The cutting tool (20) according to claim 2, wherein the first and second peripheral coupling threads (32, 36) each have slightly less than one turn.

4. The cutting tool (20) according to claim 2; wherein
   the first radial stop surface (40) is located on a first connecting surface (43) that extends between two first thread end edges (44) of the first peripheral coupling thread (32); and
   the second radial stop surface (42) is located on a second connecting surface (55) that extends between two second thread end edges (56) of the second peripheral coupling thread (36).

5. The cutting tool (20) according to claim 2, wherein
the first component (22) further comprises a first coupling end surface (28) and a first peripheral surface (30) forming a circumferential boundary thereof;
the first peripheral coupling thread (32) extends along at least a majority of a periphery of the first coupling end surface (28);
the second component (24) further comprises a second coupling end surface (52) and a second peripheral surface (54) forming a circumferential boundary thereof; and
the second peripheral coupling thread (36) extends along at least a majority of a periphery of the second coupling end surface (52).

6. The cutting tool (20) according to claim 5, wherein the first and second peripheral coupling threads (32, 36) are ground.

7. The cutting tool (20) according to claim 5, wherein
the first coupling end surface (28) comprises a female member (46) recessed therein;
the first central coupling thread (34) is located on the female member (46), forming an internal thread;
the second coupling end surface (52) comprises a male member (58) protruding therefrom; and
the second central coupling thread (38) is located on the male member (58), forming an external thread.

8. The cutting tool (20) according to claim 7, wherein
the first and second central coupling threads (34, 38) are non-continuous threads;
the portion of the female member (46) on which the first central coupling thread (34) is located comprises two diametrically opposed female non-threaded side surfaces (48); and
the portion of the male member (58) on which the second central coupling thread (38) is located comprises two diametrically opposed male non-threaded side surfaces (60).

9. The cutting tool (20) according to claim 7, wherein
the female member (46) comprises a hollowed substantially cylindrical female locating portion (50) axially interposed between the first peripheral and central coupling threads (32, 34); and
the male member (58) comprises a substantially cylindrical male locating portion (62) axially interposed between the second peripheral and central coupling threads (36, 38).

10. The cutting tool (20) according to claim 9, wherein in the assembled position, at least the male locating portion (62) is elastically deformed.

11. The cutting tool (20) according to claim 5, wherein in the assembled position, at least a majority of the periphery of each the first and second coupling end surfaces (28, 52) abut each other.

12. The cutting tool (20) according to claim 1; wherein
the first radial stop surface (40) lies on a first stop plane (P1) containing the first component axis (A); and
the second radial stop surface (42) lies on a second stop plane (P2) containing the second component axis (B).

13. The cutting tool (20) according to claim 1, wherein the first and second central coupling threads (34, 38) each comprise at least three turns.

14. The cutting tool (20) according to claim 1, wherein
the first and second peripheral coupling threads (32, 36) have a peripheral coupling thread pitch ($P_P$);
the first and second central coupling threads (34, 38) have a central coupling thread pitch ($P_C$); and
the peripheral coupling thread pitch ($P_P$) is less than the central coupling thread pitch ($P_C$).

15. The cutting tool (20) according to claim 1, wherein
one of the first and second components (22, 24) forms a tool body (64);
the other one of the first and second components (22, 24) forms a tool head (66) on which the cutting portion (26) is located.

16. The cutting tool (20) according to claim 15; wherein
the cutting tool (20) is a right-handed cutting tool for turning metal cutting operations; and
one of the first and second radial stop surfaces (40, 42) is located on the tool body (64) and is configured to oppose the torque (T) generated when the cutting portion (26) engages a work piece.

17. The cutting tool (20) according to claim 15, wherein the cutting portion (26) is integrally formed to have unitary one-piece construction with the tool head (66).

18. The cutting tool (20) according to claim 15, wherein the cutting portion (26) is made of a first material and has a cutting insert (68) releasably retained therein, the cutting insert (68) being made of a second material which is harder than the first material.

19. The cutting tool (20) according to claim 1; further comprising:
a pin (70) having a cap portion (72); wherein in the assembled position:
the pin (70) is releasably attached to the cutting tool (20) so that the cap portion (72) is located in a recessed portion (74) of the first and second peripheral surfaces (30, 54).

20. The cutting tool (20) according to claim 19; wherein
the cutting tool (20) is a left-handed cutting tool for turning metal cutting operations; and
the cap portion (72) is configured to oppose the torque (T) generated when the cutting portion (26) engages a work piece.

21. The cutting tool (20) according to claim 1, wherein the cutting tool (20) is devoid of any additional threaded attachment member for differentially coupling the first and second components (22, 24) together.

22. The cutting tool (20) according to claim 1, wherein in the assembled position, the first and second components (22, 24) are axially aligned.

23. A cutting tool (20), having a cutting portion (26), comprising:
a first component (22) having a first component axis (A) and comprising:
first peripheral and central coupling threads (32, 34), each extending in a helical direction about the first component axis (A), the first peripheral and central coupling threads (32, 34) being axially offset with respect to each other; and
a first radial stop surface (40) located at the first peripheral coupling thread (32); and
a second component (24) having a second component axis (B) and comprising:
second peripheral and central coupling threads (36, 38), each extending in a helical direction about the second component axis (B), the second peripheral and central coupling threads (36, 38) being axially offset with respect to each other; and
a second radial stop surface (42) located at the second peripheral coupling thread (36); wherein:
the first and second peripheral coupling threads (32, 36) have a peripheral coupling thread pitch ($P_P$);
the first and second central coupling threads (34, 38) have a central coupling thread pitch ($P_C$);

the peripheral coupling thread pitch (Pp) is less than the central coupling thread pitch ($P_C$); and the cutting tool (20) is adjustable between:
an unassembled position in which:
the first and second components are separated from one another, and
an assembled position in which:
the first and second radial stop surfaces (40, 42) abut each other; and
the first peripheral and central coupling threads (32, 34) threadingly engage the second peripheral and central coupling threads (36, 38), respectively.

24. A method for assembling the cutting tool (20) of claim 1, comprising:
positioning the first component (22) relative to the second component (24) so that they are substantially axially aligned, with the peripheral coupling thread (32, 36) of one component (22, 24) adjacent the central coupling thread (34, 38) of the other component (22, 24);
displacing the first and second components (22, 24) axially towards each other until the first and second peripheral coupling threads (32, 36) come into contact with each other and the first and second central coupling threads (34, 38) come into contact with each other;
rotating the first and second components (22, 24) relative to one another until the first peripheral and central coupling threads (32, 34) threadingly engage the second peripheral and central coupling threads (36, 38), respectively, to thereby initiate differential tool coupling between the first and second components (22, 24); and
further rotating the first and second components (22, 24) relative to one another until the first and second radial stop surfaces (40, 42) abut each other.

25. The method according to claim 24; comprising:
rotating the first and second components (22, 24) relative to one another by no more than a total of 90° to have the first and second radial stop surfaces (40, 42) abut each other.

26. The method according to claim 24; wherein
the first component (22) further comprises a first coupling end surface (28) and a first peripheral surface (30) forming a circumferential boundary thereof;
the first peripheral coupling thread (32) extends along at least a majority of a periphery of the first coupling end surface (28);
the second component (24) further comprises a second coupling end surface (52) and a second peripheral surface (54) forming a circumferential boundary thereof;
the second peripheral coupling thread (36) extends along at least a majority of a periphery of the second coupling end surface (52);
the first coupling end surface (28) comprises a female member (46) recessed therein;
the first central coupling thread (34) is located on the female member (46), forming an internal thread;
the second coupling end surface (52) comprises a male member (58) protruding therefrom; and
the second central coupling thread (38) is located on the male member (58), forming an external thread;
the first and second central coupling threads (34, 38) are non-continuous threads;
the portion of the female member (46) on which the first central coupling thread (34) is located comprises two diametrically opposed female non-threaded side surfaces (48); and
the portion of the male member (58) on which the second central coupling thread (38) is located comprises two diametrically opposed male non-threaded side surfaces (60);

the method comprising:
angularly aligning the female and male non-threaded side surfaces (48, 60) before displacing the first and second components (22, 24) axially towards each other; and
rotating the first and second components (22, 24) relative to one another by no more than a total of 90° to have the first and second radial stop surfaces (40, 42) abut each other.

27. The method according to claim 26; wherein
the female member (46) comprises a hollowed substantially cylindrical female locating portion (50) axially interposed between the first peripheral and central coupling threads (32, 34); and
the male member (58) comprises a substantially cylindrical male locating portion (62) axially interposed between the second peripheral and central coupling threads (36, 38); and
the step of displacing the first and second components (22, 24) axially towards each other comprises the step of:
slidingly receiving the male locating portion (62) into the female locating portion (50).

28. A cutting tool (20), having a cutting portion (26), comprising:
a first component (22) having a first component axis (A) and comprising:
first peripheral and central coupling threads (32, 34), each extending in a helical direction about the first component axis (A), the first peripheral and central coupling threads (32, 34) being axially offset with respect to each other, the first central coupling thread (34) being a non-continuous thread formed on a female member (46); and
a first radial stop surface (40) located at the first peripheral coupling thread (32); and
a second component (24) having a second component axis (B) and comprising:
second peripheral and central coupling threads (36, 38), each extending in a helical direction about the second component axis (B), the second peripheral and central coupling threads (36, 38) being axially offset with respect to each other, the second central coupling thread (38) being a non-continuous thread formed on a male member (58); and
a second radial stop surface (42) located at the second peripheral coupling thread (36);
wherein the first and second components (22, 24) are configured to permit insertion of the male member (58) into the female member (46), followed by a rotation of the first and second components (22, 24) relative to one another by no more than a total of 90° to have the first and second radial stop surfaces (40, 42) abut each other, during which rotation the first and second central coupling threads (34, 38) engage one another and, simultaneously, the first and second peripheral coupling threads (32, 36) engage one another.

29. The cutting tool (20) according to claim 28, wherein
the first and second peripheral coupling threads (32, 36) have a peripheral coupling thread pitch ($P_P$);
the first and second central coupling threads (34, 38) have a central coupling thread pitch ($P_C$); and
the peripheral coupling thread pitch ($P_r$) is less than the central coupling thread pitch ($P_C$).

30. The cutting tool (20) according to claim 28, wherein
the first and second central coupling threads each comprise at least three turns.

* * * * *